(12) United States Patent
Ruhland et al.

(10) Patent No.: US 11,794,561 B2
(45) Date of Patent: Oct. 24, 2023

(54) DEVICE FOR APPLYING A RUBBER PROFILE

(71) Applicant: AyTec Automation GmbH, Mintraching (DE)

(72) Inventors: Christian Ruhland, Sinzing (DE); Juergen Gollwitzer, Deggendorf (DE); Wolfgang Thurmer, Pfatter (DE); Thomas Brueckl, Thalmassing (DE)

(73) Assignee: AyTec Automation Gmbh, Mintraching (DE)

( * ) Notice: Subject to any disclaimer, the term of this patent is extended or adjusted under 35 U.S.C. 154(b) by 3 days.

(21) Appl. No.: 17/370,775

(22) Filed: Jul. 8, 2021

(65) Prior Publication Data

US 2022/0016963 A1    Jan. 20, 2022

(30) Foreign Application Priority Data

Jul. 17, 2020    (DE) .......................... 102020118940.0

(51) Int. Cl.
*B60J 10/00* (2016.01)
*B60J 10/34* (2016.01)
*B23P 19/04* (2006.01)

(52) U.S. Cl.
CPC ............. *B60J 10/45* (2016.02); *B23P 19/047* (2013.01); *B60J 10/34* (2016.02)

(58) Field of Classification Search
CPC .......... B60J 10/45; B60J 10/34; B23P 19/047; B62D 65/06; B29C 65/56; B29C 65/80
See application file for complete search history.

(56) References Cited

U.S. PATENT DOCUMENTS

| | | | | | |
|---|---|---|---|---|---|
| 4,172,313 | A | * | 10/1979 | Takahashi | ........... E04F 21/0069 |
| | | | | | 29/235 |
| 4,528,736 | A | * | 7/1985 | Hope | .................. B25B 27/0092 |
| | | | | | 29/235 |
| 4,620,354 | A | * | 11/1986 | Hess | ........................ B60J 10/45 |
| | | | | | 29/451 |

(Continued)

FOREIGN PATENT DOCUMENTS

| DE | 3607418 A1 | 9/1987 |
|---|---|---|
| DE | 102006056276 A1 | 6/2008 |

(Continued)

*Primary Examiner* — Moshe Wilensky
(74) *Attorney, Agent, or Firm* — AVEK IP, LLC; Kent R. Erickson

(57) ABSTRACT

A device for applying a rubber profile to a surface comprises a robot arm moving and guiding a guide head into a position to apply the rubber profile along a defined contour on the surface. A feed device connected to the guide head feeds the rubber profile onto the surface at a defined speed. A guide element on the guide head guides the rubber profile. The feed device includes a motorized drive roller, with a profiled circumferential surface, and a counter-element with a passage for the rubber profile formed between the drive roller and the counter-element, such that the profiled circumferential surface engages the rubber profile A control unit detects the speed of the guide head where the rubber profile is applied to the surface and controls a drive roller such that the rubber profile is advanced on the basis of this speed.

21 Claims, 3 Drawing Sheets

(56) References Cited

U.S. PATENT DOCUMENTS

| | | | | |
|---|---|---|---|---|
| 4,653,166 A * | 3/1987 | Bright | B23P 19/047 | 277/648 |
| 4,715,110 A * | 12/1987 | St. Angelo | B23P 19/047 | 29/235 |
| 4,760,636 A * | 8/1988 | St. Angelo, Jr. | B23P 19/047 | 29/450 |
| 4,780,943 A * | 11/1988 | St. Angelo | B23P 19/047 | 901/36 |
| 4,897,913 A * | 2/1990 | St. Angelo, Jr. | B23P 19/047 | 29/430 |
| 4,996,756 A * | 3/1991 | Bright | B60J 10/45 | 29/243.58 |
| 5,020,278 A * | 6/1991 | St. Angelo, Jr. | B60J 10/45 | 901/41 |
| 5,029,381 A * | 7/1991 | St. Angelo, Jr. | B23P 19/047 | 29/701 |
| 5,031,293 A * | 7/1991 | Goedderz | B60J 10/45 | 29/235 |
| 5,048,170 A * | 9/1991 | Kuppers | B23P 19/047 | 29/235 |
| 5,065,486 A * | 11/1991 | Goedderz | B23P 19/047 | 292/35 |
| 5,067,225 A * | 11/1991 | St. Angelo, Jr. | B23P 19/047 | 29/451 |
| 5,103,547 A * | 4/1992 | Holloway | E06B 7/22 | 29/451 |
| 5,121,532 A * | 6/1992 | Massie | B62D 65/14 | 29/709 |
| 5,129,134 A * | 7/1992 | St. Angelo, Jr. | B23P 19/047 | 901/50 |
| 5,155,890 A * | 10/1992 | Goedderz | B60J 10/45 | 29/243.58 |
| 5,169,081 A * | 12/1992 | Goedderz | B23P 19/047 | 242/598.6 |
| 5,199,154 A * | 4/1993 | Mesnel | B62D 65/14 | 29/451 |
| 5,201,106 A * | 4/1993 | Moore | B23P 19/047 | 414/744.1 |
| 5,237,730 A * | 8/1993 | Goedderz | B60J 10/45 | 29/243.58 |
| 5,237,741 A * | 8/1993 | Goedderz | B62D 65/14 | 29/709 |
| 5,243,747 A * | 9/1993 | Mesnel | B62D 65/14 | 29/243.58 |
| 5,693,174 A * | 12/1997 | Nakata | B29C 48/12 | 156/569 |
| 5,735,032 A * | 4/1998 | Stone | B60J 10/45 | 29/235 |
| 5,940,950 A * | 8/1999 | Galat | B23P 19/047 | 29/243.58 |
| 6,341,410 B1 * | 1/2002 | Armellini | B25B 27/0092 | 29/235 |
| 6,622,362 B1 * | 9/2003 | Scharmann | B23P 19/047 | 29/451 |
| 6,868,595 B1 * | 3/2005 | Cycholl | B25B 27/0092 | 29/235 |
| 7,384,255 B2 * | 6/2008 | LaBossiere | B29C 64/227 | 425/375 |
| 8,161,624 B2 * | 4/2012 | Richter | B23P 19/047 | 29/451 |
| 8,181,325 B2 * | 5/2012 | Komatsu | B60J 10/45 | 29/243.526 |
| 8,307,524 B2 * | 11/2012 | Bednarz | B23P 19/047 | 269/37 |
| 8,398,808 B2 * | 3/2013 | Grohmann | B23P 19/047 | 156/577 |
| 9,175,190 B2 * | 11/2015 | Paschmann | B23P 19/047 | |
| 9,321,609 B2 * | 4/2016 | Koop | B29C 64/118 | |
| 2006/0070224 A1 * | 4/2006 | Gratien | B23P 19/047 | 29/451 |
| 2009/0260211 A1 * | 10/2009 | Komatsu | B60R 13/06 | 29/700 |
| 2009/0301634 A1 * | 12/2009 | Malecki | B23P 19/047 | 156/64 |
| 2013/0030567 A1 * | 1/2013 | Pleace | B23P 19/047 | 49/506 |
| 2013/0037212 A1 * | 2/2013 | Maischberger | B23P 19/047 | 156/499 |
| 2014/0102614 A1 * | 4/2014 | Bischof | B23P 19/047 | 156/60 |
| 2015/0306945 A1 * | 10/2015 | Gabel | B23P 19/047 | 156/349 |
| 2018/0120171 A1 * | 5/2018 | Bauer | G01L 1/04 | |
| 2018/0345774 A1 * | 12/2018 | Grohmann | B25J 11/005 | |
| 2019/0105976 A1 * | 4/2019 | Thommes | B60J 10/34 | |
| 2019/0360588 A1 * | 11/2019 | Levesque | B23P 19/047 | |

FOREIGN PATENT DOCUMENTS

| | | |
|---|---|---|
| DE | 102014112185 A1 | 3/2016 |
| DE | 102014113509 A1 | 3/2016 |
| DE | 102017122725 A1 | 4/2019 |
| EP | 1813562 A1 | 12/2006 |
| EP | 2067645 A2 | 10/2009 |
| EP | 3194254 A1 | 7/2018 |
| GB | 1588213 A | 4/1981 |
| WO | 2016041548 A1 | 3/2016 |

\* cited by examiner

DEVICE FOR APPLYING A RUBBER PROFILE

CROSS-REFERENCE TO RELATED APPLICATIONS

This application claims the benefit of German Patent Application No. DE 10 2020 118 940.0, filed Jul. 17, 2020, the disclosure of which is hereby incorporated herein in its entirety by reference.

BACKGROUND

The invention relates to a device for applying a rubber profile on a sealing surface, in particular in a passenger automobile, e.g. on a door or an automobile chassis. These devices are used in particular in automotive engineering where rubber seals must be attached to door frames or trunk linings on a motor vehicle chassis. These devices contain a manipulating device, normally a robot, which typically comprises at least one robot arm, which can move freely in three dimensions and is therefore capable of precisely guiding the rubber profile along the door frame or the trunk lining using a guide head. The guide head also has at least one guide element, which guides the rubber profile to a defined position in relation to the structure. This guide element is frequently formed by a guide head, normally comprising numerous guide rollers.

SUMMARY

EP 3 194 254 A1 shows a device in which the rubber profile is conveyed with a constant torque, and thus with a slight compression, onto the surface. As a result, the rubber profile is slightly compressed when it is glued onto the structure, such that it cannot become detached from the structure due to internal tensions in the rubber profile. This can, however, result in deformations in the rubber profile, in particular along non-linear sections on the surface.

The object of the present invention is to create a device for applying a rubber profile to a structure that enables a simple and reliable gluing of the rubber profile to the structure, while eliminating tensions and deformations in the rubber profile.

This object is achieved by a device that has the features of claim 1. Advantageous developments are the subject matter of the dependent claims.

The device for applying a rubber profile to a surface according to the present invention contains a manipulation device, normally a robot, which has a robot arm for moving and guiding a guide head into an application position to apply the rubber profile along a defined contour on the surface. In conjunction with the guide head, there is a feed device for feeding the rubber profile onto the surface at a defined speed. The guide head has at least one guide element for guiding the rubber profile. The feed device has at least one motorized drive roller with a profiled peripheral surface, and a counter-element, with a passage for the rubber profile formed between the drive roller and the counter-element. The profiled peripheral surface contains spikes that stick into the material of the rubber profile while it is advanced, thus forming a material bond between the peripheral surface on the drive roller and the rubber profile. As a result, the absolute speed of the peripheral surface corresponds precisely to the speed at which the rubber profile is advanced. Slippage between the peripheral surface and the rubber profile is thus basically eliminated, or at least substantially reduced.

The passage is formed such that the spikes engage in the rubber profile. The transfer of force from the drive roller to the rubber profile is therefore obtained via the spikes on the drive roller. The drive roller is connected to a drive, in particular an electric motor, which is controlled by a control unit in the device. The control unit contains a means for detecting the speed of the guide head at the point wherein the rubber profile is applied to the surface, and controlling the drive roller such that the rubber profile is advanced on the basis of this detected speed, preferably at precisely the detected speed. The advancement speed can optionally be set a little higher than the detected speed at specific regions on the surface, e.g. curved surfaces or curves in the rubber profile on the surface. As a result, the rubber profile is fed into these regions with a slight compression, such that it will not become detached due to internal tensions formed in the applied rubber profile. The spikes, in combination with the speed control of the drive roller, therefore allow a precise control of the advancement speed and application speed of the rubber profile, without slippage, and therefore result in an optimized application, reducing or eliminating deformations or tensions in the profile when it is applied.

This application device according to the invention has the advantage that the rubber profile is advanced through the passage between the counter-element, preferably in the form of a glide plate, and the peripheral surface of the structured drive roller, at basically precisely the same speed as that of the guide head at the application point for the rubber profile. This has the advantage that the rubber profile is neither stretched nor compressed, which could lead to deformation and/or detachment when applying the rubber profile. As a result, the application is always optimal, and guarantees an unforced application and adhesion of the rubber profile on the surface to which it is to be applied, e.g. an automobile chassis in the region of the door or hatchback or sunroof.

The spikes are preferably between 0.5 mm and 2 mm long, with a diameter of 0.3 mm to 2 mm, such that they reliably engage in the rubber profile to advance it, but do not damage it.

In theory, the spikes can be formed like those known from the prior art, e.g. in the form of a small nail, i.e. cylindrical elements with points. The spikes are preferably conical, however, such that they exhibit a high mechanical stability and do not break off easily, but can still reliably stick into the rubber profile with their points. In theory, the bases thereof can take any form, e.g. rectangular or star-shaped. They preferably have a circular base, however. This is the easiest to produce, and results in the least damage to the rubber profile.

In theory, the spikes only need to project in some manner from the peripheral surface in order to advance the rubber profile. They preferably project radially from the peripheral surface. The mechanical engagement of the spikes in the rubber profile is minimized in this manner, such that the rubber profile is not damaged by the spikes.

The spikes on the peripheral surface can preferably be replaceable, such that damaged spikes can be replaced individually, without having to replace the entire drive roller.

The counter-element is preferably formed by a glide plate. It has been shown that a glide plate interacts best with the peripheral surface of the drive roller, because it forms a defined counter-surface to the drive roller in the passage.

The friction between the rubber profile and the glide plate is so low that there is no slippage in comparison with the drive speed of the drive roller.

In an advantageous development of the invention, an unmotorized pressure element is located on the guide head, in particular a pressure roller. The pressure element is designed to press against the rubber profile applied to the surface in the application position by means of a tensioned spring device. In this manner, the rubber profile is pressed once more against the surface on the automobile, such that the adhesive layer on the rubber profile bonds the rubber profile to the surface, without the effects of other forces, as would be the case, for example, with a motorized pressure roller.

The guide element is preferably oriented to the surface in the application setting at an acute angle, counter to the direction in which the guide head moves. In this manner, the rubber profile is placed on the surface at the right location and with minimal movement. This also reduces deformation of the rubber profile when it is applied.

In an advantageous development of the invention, the guide head does not have a motorized application roller for pressing the rubber profile against the surface, thus preventing a further application of force to the rubber profile while it is being applied, and thus preventing potential deformation of the profile during the application.

The drive roller is preferably placed directly in front of the application location for the rubber profile on the structure, thus reducing, or even minimizing, the distance between the application of advancement force and the application point. This results in a minimizing of frictional effects to the rubber profile after it has been advanced by the drive roller.

The guide roller preferably contains a guide element with a hollow profile, the shape of which corresponds precisely to the outer shape of the rubber profile. In this manner, the rubber profile can be guided precisely to the application location. The passage between the drive roller and the counter-element can be formed in the region of the hollow profile.

In an advantageous development of the invention, the guide element is located along with the feed device in a housing, such that the entire device is protected against access, and the functional reliability is improved.

In one embodiment of the invention, the counter-element is formed by a counter-roller, which is located in the passage opposite the drive roller. As a result, the rubber profile is advanced without frictional losses due to the counter-element. In an alternative embodiment, the counter-roller can also be formed by a second drive roller, opposite the first drive roller, wherein the passage for at least a part of the rubber profile is formed between the first drive roller and the second drive roller. This embodiment also ensures that the torque applied by the drive rollers is implemented entirely in advancing the rubber profile.

The drive roller is preferably designed to interact with an e-shaped rubber profile, in which case the passage and the drive wheel are arranged such that downward leg of the e is located beneath the closed section and advanced between the counter-element and the drive roller.

In an advantageous development of the invention, the guide head contains a removal device for removing the cover strip on an adhesive surface on the rubber profile, such that the rubber profile is not only advanced by the device, but the adhesive surface is also exposed. The removal device is preferably located downstream of the drive roller in the direction of advancement, such that the exposed adhesive surface does not adhere in the passage between the drive roller and the counter-element. The cover strip covering the adhesive surface is thus removed directly in front of the application point for the rubber profile.

The drive roller is located in the guide head directly in front of the location where the rubber profile is applied to the structure. This means that the distance from the drive roller to the point where the rubber profile is glued to the structure is very short, such that the advancement force applied thereto is affected as little as possible by the elasticity of the rubber profile.

In an advantageous development of the invention, the guide head has a hollow profile, e.g. in the passage, the shape of which corresponds, at least approximately, to the outer shape of the rubber profile. The rubber profile is fed through this hollow profile prior to its application on the structure. As a result, the rubber profile is deformed as little as possible when applied to the structure and when the magnetic torque is introduced by the drive roller. This embodiment of the invention therefore reinforces the constant operating conditions with regard to advancement at a defined speed, thus creating defined and constant conditions for applying the rubber profile resulting in a clearly improved adhesion and precision of the application of the rubber profile to the structure. This embodiment therefore enables a very precise positioning of rubber profiles, e.g. in the outer contour of a motor vehicle.

It should not be necessary to point out that the device is designed in particular for a rubber profile with a self-adhering surface, such that the rubber profile remains glued to the structure after it has been applied. Alternatively, an adhesive layer can be applied by the guide head to either the rubber profile or the structure prior to applying the rubber profile to the structure.

The guide head is preferably located along with the feed device in a housing, such that the functional components of the guide head, e.g. the drive motor, drive roller, and counter-element are protected in the work environment. This reduces, among other things, the risk of an accident in the workplace, while also ensuring that the individual components in the guide head are protected against avoidable damage by external effects. The components located in the housing are also better protected against contaminants.

In an advantageous development of the invention, the passage between the drive roller and the counter-roller or between the first drive roller and the second drive roller is designed to accommodate a large portion of the rubber profile. In particular, rubber profiles in the automotive industry normally contain a hollow profile, in order to provide the necessary elasticity required for a reliable sealing of the door area or trunk area. A hollow profile has the disadvantage that it yields strongly to forces, making it difficult to apply a force to the hollow profile in a defined manner. These hollow profiles normally have a solid section, however, particularly in the section in which the rubber profile is glued to the structure. The passage is preferably designed precisely for this solid section, such that the torque applied thereto does not deform the rubber profile, but instead actually advances it.

To standardize the application conditions, the device for applying the rubber profile can also have a pressure device for pressing the applied rubber profile onto the structure. This pressure device can be integrated in the guide head, for example, or it can be a separate device attached thereto. It can comprise rollers that act on a part of the rubber profile to press it against the structure. This ensures that the rubber profile is applied to the structure in a defined manner.

The following expressions are used synonymously: cover strip—liner; drive roller—drive wheel; surface—outer surface—sealing surface; device—application device; manipulation device—robot.

BRIEF DESCRIPTION OF THE DRAWINGS

The invention shall be described below by way of example, in reference to the schematic drawings. Therein.

DETAILED DESCRIPTION

Figure 1:
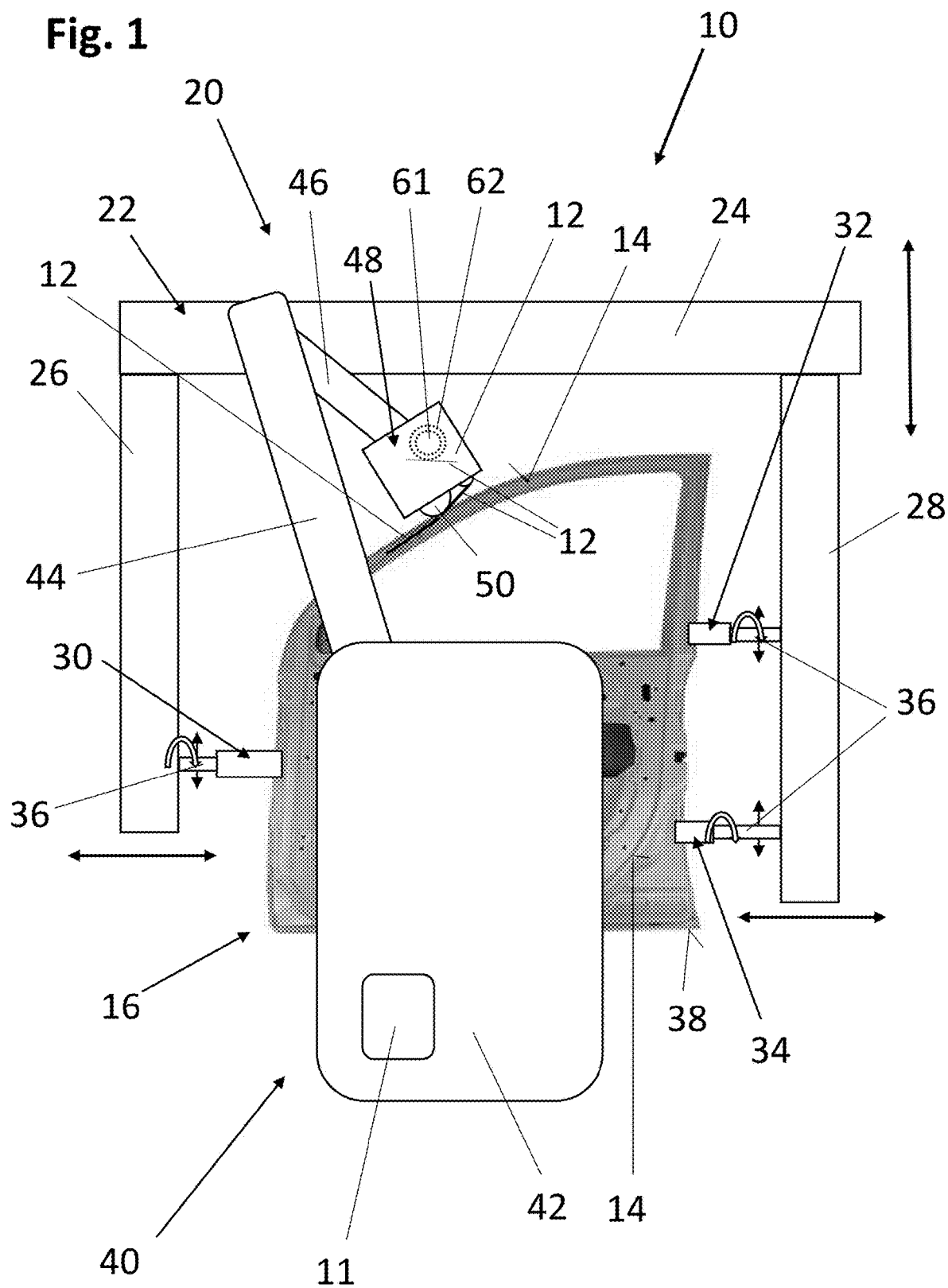
FIG. 1 shows a schematic illustration of the application device, with a guide head for applying the rubber profile moved by a robot.

FIG. 1 shows an application device 10 for applying a rubber profile 12 to a surface, e.g. a circumferential sealing surface 14 on a motor vehicle part 16, a motor vehicle door in this example. The device 10 contains, e.g. a retaining device 20 with a retaining frame 22, comprising a horizontal strut 24 with two vertical struts 26, 28 at a variable distance to one another. The retaining frame 22 can be moved by a movement device, not shown, between a motor vehicle part location, an application position, and a second location for processed motor vehicle parts. A first claw 30 is located on the first vertical strut 26, and two more claws 32, 34, i.e. a second claw 32 and a third claw 34, are located on the second vertical strut 28. The vertical positions of each claw 30, 32, 34 can be adjusted on the vertical struts 26, 28. Each claw 30, 32, 34 is retained by a corresponding arm 36, via a dedicated positioning mechanism, at its distance to the vertical struts 26, 28, such that it can rotate about its longitudinal axis. Each of the three claws 30, 32, 34 is therefore retained at its distance to the respective vertical strut 26, 28 in its vertical position on the vertical strut 26, 28, and can rotate about its longitudinal axis. In addition to the circumferential sealing surface, the motor vehicle part 12 also has a circumferential edge 38 with which it is held by the three claws 30, 32, 34.

The application device 10 also comprises a robot 40, functioning as a manipulation device, which is located upstream of the retaining frame 22 on the side of the circumferential sealing surface 14 on the motor vehicle part 16. The robot comprise a body 42, on which a first robot arm 44 is pivotally mounted, which has a second pivotal robot arm 46 on its free end, which in turn has a guide head 48 on its free end that can preferably pivot and/or rotate about an axis, which presses a rubber profile 12 onto the circumferential surface 14 on the motor vehicle part 16 in the known manner. The application takes place in the guide head 48, frequently, but not necessarily, via a pressure roller 50. The guide head 48 comprises a drive, e.g. an electric motor 61 which drives a drive roller 62 coating with the rubber profile to move the rubber profile 12 forward. The rubber profile 12 normally has a liner, or cover strip 76, (FIG. 4), which covers a downward facing adhesive surface 74 on the rubber profile 12. The liner 76 is removed prior to application, such that when the rubber profile 12 is pressed onto the sealing surface 14 by the pressure roller 50, the rubber profile 12 is reliably glued onto the sealing surface 14 on the motor vehicle part 16.

The application device 10 also comprises a control unit 11, located by way of example in the body 42, which controls the robot 40 and thus the movement of the guide head 48 along the sealing surface 14 of the automobile part. This control unit detects the speed of the guide head 48 in relation to the sealing surface 14 and is designed to control the advancement speed of the rubber profile 12 by the feed device 60 described below.

Figure 2:
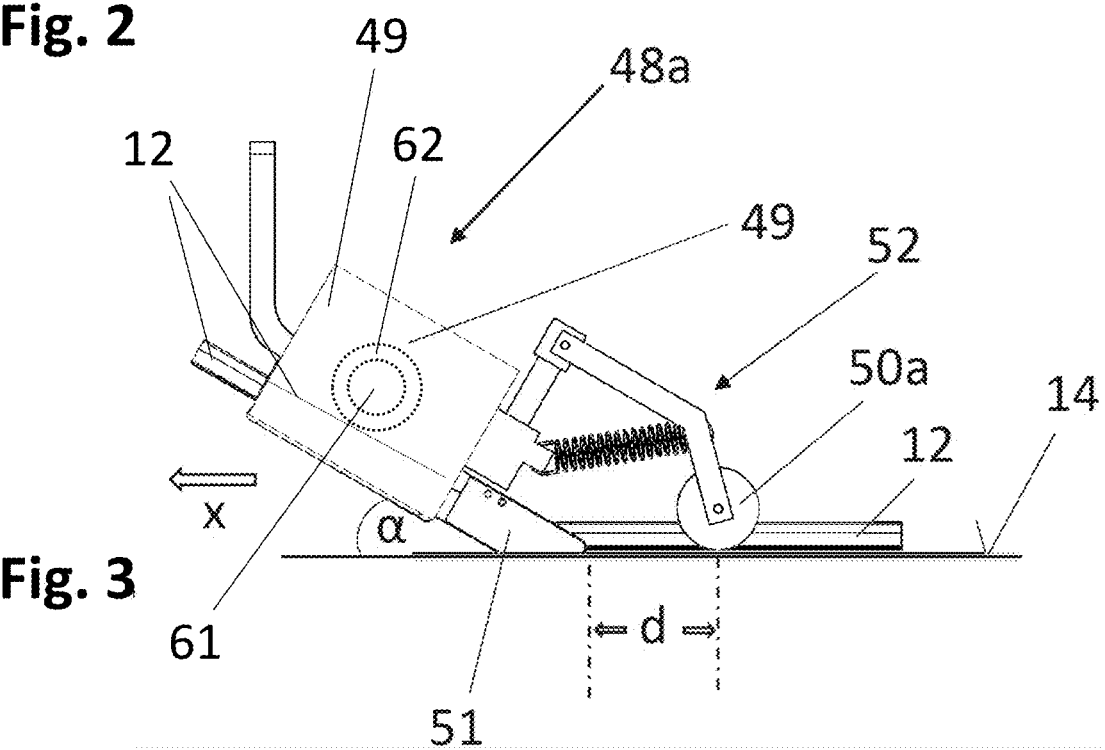
FIG. 2 shows a side view of an embodiment of the guide head in FIG. 1, with a feed device for applying the rubber profile to a structure.

FIG. 2 shows an alternative embodiment 48a of a guide head that has a housing 49 in which a feed device 60 (FIGS. 3 to 5) for a rubber profile 12 with an e-shaped cross section is located with a drive, e.g. an electric motor 61 rotating a drive roller 62. The rubber profile 12 is not placed on the sealing surface 12 with a pressure roller 50 with this guide head 48, but instead is fed solely due to the advancement of the rubber profile into a first guide element 51, which is at an acute angle α to the direction of movement x of the guide head 48a in relation to the sealing surface 14. A non-motorized drive roller 50a first presses the rubber profile 12 at a distance d after its application onto the sealing surface 14 by means of a spring device 52, and ensures a reliable adhesion of the rubber profile 12 to the sealing surface 14 by means of its adhesive surface. An application member may be used to refer to the pressure roller 50 and/or to the first guide element 51.

Figure 3:
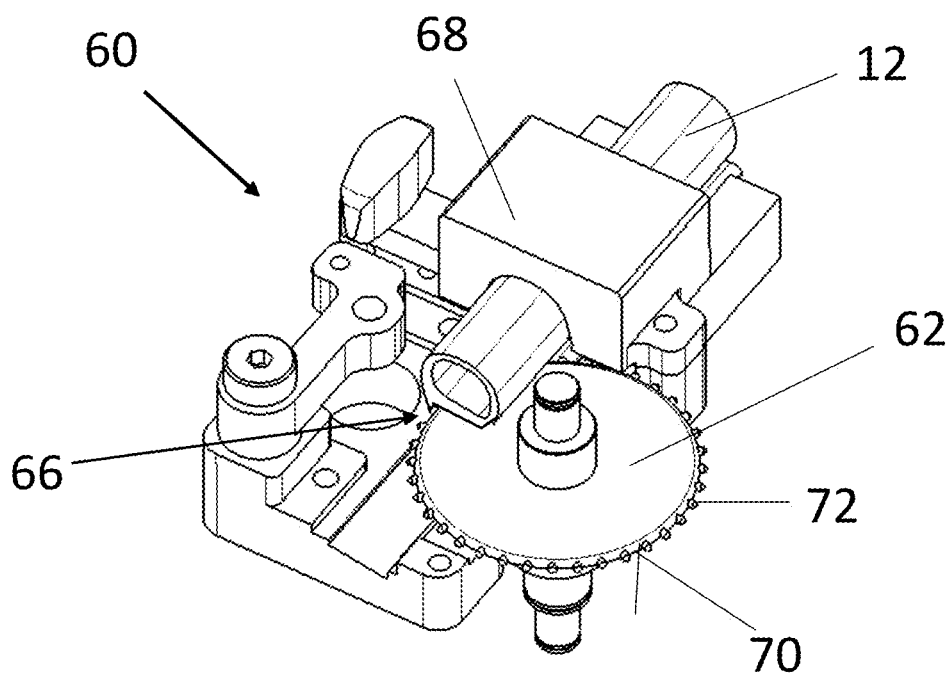
FIG. 3 shows a perspective view of a feed device that has a drive roller and a counter-element in a guide head according to FIG. 1 or 2.
Figure 4:
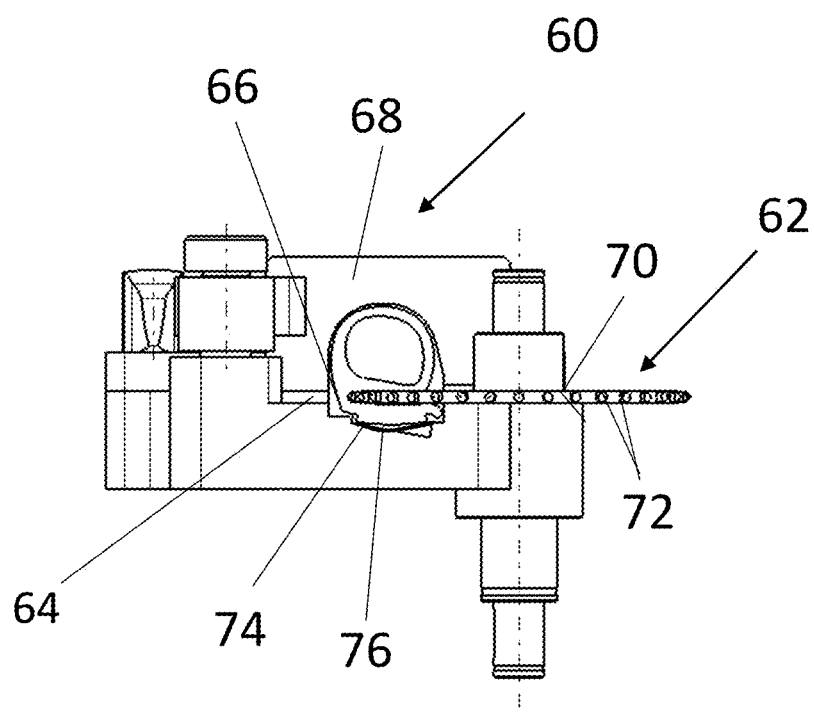
FIG. 4 shows a front view of the feed device in FIG. 3.
Figure 5:
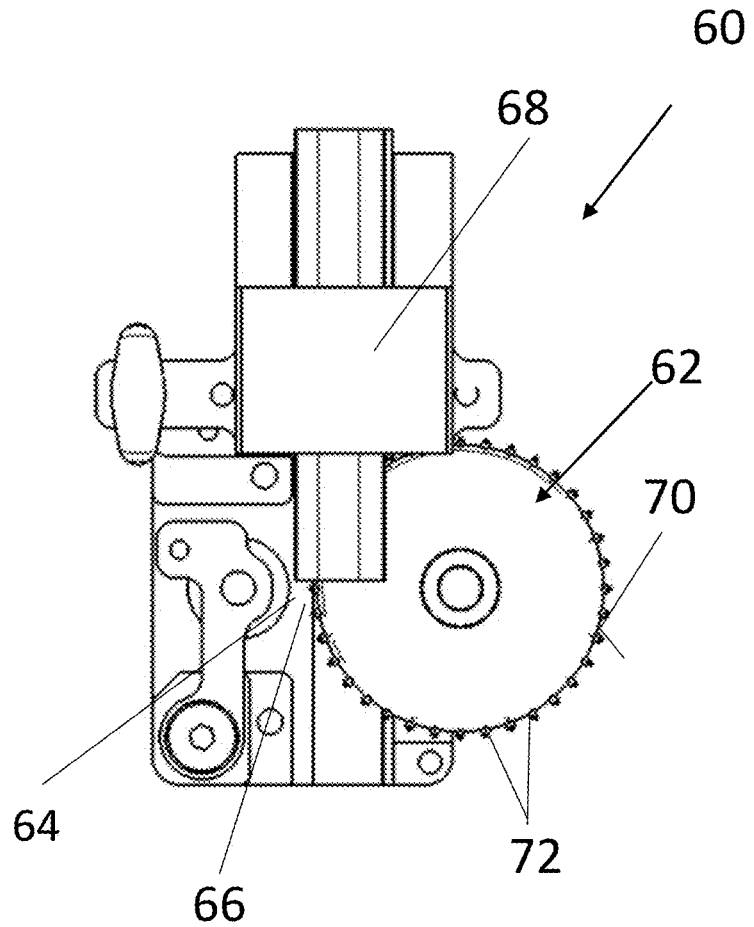
FIG. 5 shows a view of the feed device from FIG. 3 from above.

The following FIGS. 3 to 5 show different views of a feed device 60, as it can be used in the guide heads 48, 48a in FIGS. 1 and 2. The feed device 60 for the rubber profile 12 comprises a drive roller 62, which is powered by a drive motor 61 (not shown in FIGS. 3-5). A glide plate 64 is located opposite the drive roller 62, forming a counter-element thereto, such that a passage 66 for the rubber profile is formed between the two, following a second guide element 68, which has a passage for the rubber profile that corresponds precisely to the outer shape of the rubber profile 12. In this manner, the rubber profile 12 is fed precisely into the passage 66 between the drive roller and the glide plate 64. The drive roller 62 has a circumferential surface 70 populated with spikes 72.

The drive roller 62 is extremely narrow in the axial direction, in the manner of a thin drive wheel. As a result, it is designed to engage in a lower surface of the closed region of the e-shaped rubber profile, and thus hold the vertical section of the e directly beneath the closed portion of the profile, and advance it. This vertical leg of the e (before it transitions to the horizontal part), is held between the drive roller 62 and the glide plate 64, and conveyed forward by the spikes 72 on the circumferential surface 60 of the rotating drive wheel 62 at precisely the speed of the guide head 48 in relation to the sealing surface 14 on the automobile part 16, or somewhat faster. Optionally, the speed can be controlled at specific areas on the surface 14, e.g. where the rubber profile 12 passes through a curve, such that the advancement speed of the feed device 60 is slightly greater than the detected relative speed of the guide head 48 in relation to the sealing surface 14. The rubber profile 12 is thus advanced at these points with a slight compression, which counteracts a detachment due to internal tensions formed in the rubber profile 12 after it has been applied.

The rubber profile 12 applied to an automobile part, e.g. a door frame or trunk lining in a motor vehicle chassis, is shown in profile in FIG. 4. The e-shaped rubber profile 12 comprises an upper, closed hollow section, and a lower application section, corresponding to the lower part of the e, which first has a vertical section that then transitions into a lower horizontal section of the rubber profile. The adhesive surface 74 is located on the lower surface of this horizontal section of the rubber profile, which is covered by the cover strip 76. The cover strip 76 covers the adhesive surface 74 prior to application on the surface of the automobile part 16, and ensures that the rubber profile 12 does not get stuck in the guide head 48, and is easier to work with on the whole. The guide head 48 therefore preferably contains a removal device, not shown, for removing the cover strip 76 from the adhesive surface 75 of the rubber profile 12, before it is applied to the surface 14 of the automobile part 16. The cover strip 76 is first removed immediately prior to applying the rubber profile 12 to the sealing surface 14 on the motor vehicle part 16.

The invention is not limited to the exemplary embodiments described herein, but instead can be varied within the scope of protection in the following claims.

LIST OF REFERENCE SYMBOLS 10 application device
11 control unit for the application device
12 rubber profile
14 sealing surface on an automobile part, e.g. chassis or door
16 motor vehicle part
20 retaining device for an automobile part
22 retaining frame
24 horizontal strut of the retaining frame
26 first vertical strut of the retaining frame
28 second vertical strut of the retaining frame
30 first claw
32 second claw
34 third claw
36 arm for each claw
38 circumferential edge of the automobile part
40 robot
42 body of the robot
44 first robot arm
46 second robot arm
48 guide head mounted on second robot arm
49 housing of the guide head
50, 50a pressure roller
51 first guide element
52 spring device for tensioning the pressure roller against the rubber profile
60 feed device
61 drive—electric motor
62 drive roller
64 counter-element—glide plate
66 passage between the drive roller and the counter element
68 second guide element
70 circumferential surface of the drive roller
72 spikes on the circumference of the drive roller
74 adhesive surface on the rubber profile
76 cover strip (liner) for covering the adhesive surface until application of the rubber profile
α angle of inclination
x direction of movement
d distance between the application point for the rubber profile and the pressure roller

We claim:

1. A device for applying a rubber profile to a surface, comprising:
a guide head having at least one application member, wherein the guide head guides the rubber profile onto the surface at a defined speed and the at least one application member guides the rubber profile;
a robot having at least one robot arm for moving and guiding the guide head to an application position in order to apply the rubber profile along a defined contour on the surface;
a feed device connected to the guide head and configured to engage the rubber profile, wherein the rubber profile is e-shaped and comprises a hollow section and a horizontal section connected to and spaced from the hollow section by a leg, the feed device including:
a guide element,
at least one drive roller connected to a drive, the at least one drive roller having a profiled circumferential surface formed on its periphery, the at least one drive roller sized such that the at least one drive roller can extend between the hollow section and the horizontal section of the rubber profile,
a plurality of spikes formed on the profiled circumferential surface, and
a counter-element,
wherein a passage for the leg of the rubber profile is formed between the at least one drive roller and the counter-element,
the at least one drive roller is sized such that the at least one drive roller is extendable between the hollow section and the horizontal section of the rubber profile with the plurality of spikes formed on the profiled circumferential surface of the at least one drive roller at least partially engaging the leg of the rubber profile, and
the at least one drive roller is positioned relative to the guide element such that the at least one drive roller engages the leg of the rubber profile to advance the rubber profile as the rubber profile exits the guide element, and
a control unit for controlling the drive, the control unit containing means for detecting a speed of the guide head where the rubber profile is applied to the surface, and controlling the at least one drive roller such that the rubber profile is advanced on a basis of a detected speed.

2. The device according to claim 1 wherein the plurality of spikes are between 0.5 mm and 2 mm long, and have a diameter of 0.3 mm to 2 mm.

3. The device according to claim 1 wherein the plurality of spikes are conical.

4. The device according to claim 1 wherein the plurality of spikes protrude radially from the profiled circumferential surface.

5. The device according to claim 1 wherein the counter-element is formed by a glide plate.

6. The device according to claim 1 wherein a non-motorized pressure roller is located on the guide head, which pressure roller is designed to press against the rubber profile placed on the surface in the application position by means of a tensioned spring device.

7. The device according to claim 1 wherein the at least one application member is oriented in the application position at an acute angle (α) to the surface, counter to a direction of movement (x) for the guide head.

8. The device according to claim 1 wherein the guide head does not have a motorized application roller for pressing the rubber profile against the surface.

9. The device according to claim 1 wherein the at least one drive roller is located directly in front of the application position for the rubber profile on the surface.

10. The device according to claim 1 wherein the guide element has a hollow profile, and a shape of the hollow profile corresponds to an outer contour of the rubber profile.

11. The device according to claim 1 wherein the at least one application member is located along with the feed device in a housing.

12. The device according to claim 1 wherein the counter-element is formed by a counter-roller, located opposite the at least one drive roller.

13. The device according to claim 1 wherein the at least one drive roller is a first drive roller and the counter-element is formed by a second drive roller, located opposite the first drive roller.

14. The device according to claim 1 wherein the guide head has a removal device for removing a cover strip from an adhesive surface on the rubber profile.

15. The device according to claim 1 wherein at specific areas on the surface, the at least one drive roller advances the rubber profile at an advancement speed that is greater than the detected speed of the guide head.

16. A device for applying a rubber profile to a surface, wherein the rubber profile comprises an upper section and a lower section extending from the upper section, the device comprising:
  a guide head that guides the rubber profile onto the surface;
  a robot having at least one robot arm for moving and guiding the guide head to an application position in order to apply the rubber profile along a defined contour on the surface;
  at least one motorized drive roller connected to the guide head and having a profiled circumferential surface formed on its periphery, the at least one motorized drive roller is sized and configured to extend between the upper section and the lower section of the rubber profile,
  a plurality of spikes formed on the profiled circumferential surface of the at least one motorized drive roller, wherein the plurality of spikes at least partially engage a transition section between the upper section and the lower section of the rubber profile when the at least one motorized drive roller extends between the upper section and the lower section such that the rubber profile is advanced forward by the plurality of spikes of the at least one motorized drive roller, and
  a control unit, the control unit operable to detect a speed of the guide head where the rubber profile is applied to the surface, and control the at least one motorized drive roller such that the rubber profile is advanced on a basis of the speed.

17. The device according to claim 16, wherein the guide head includes a non-motorized pressure roller to apply and press the rubber profile to the surface.

18. The device according to claim 16, wherein the guide head includes a first guide element to apply the rubber profile to the surface and the device further comprises a non-motorized drive roller to press the rubber profile to the surface.

19. The device according to claim 16 further comprising a glide plate, wherein a passage for the rubber profile is formed between the at least one motorized drive roller and the glide plate.

20. The device according to claim 16 further comprising a counter-roller, wherein a passage for the rubber profile is formed between the at least one motorized drive roller and the counter-roller.

21. A device for applying a rubber profile to a surface, the rubber profile having a hollow section and a lower section depending from the hollow section, the device comprising:
  a guide head that guides the rubber profile onto the surface;
  a robot having at least one robot arm for moving and guiding the guide head to an application position in order to apply the rubber profile along a defined contour on the surface;
  a drive roller connected to a drive, the drive roller having a profiled circumferential surface formed on its periphery;
  a plurality of spikes formed on the profiled circumferential surface, each spike converging toward a point from a base;
  a glide plate;
  a guide element having a hollow profile corresponding to an outer contour of the rubber profile and positioned to guide the rubber profile to engage the drive roller; and
  a control unit for controlling the drive, the control unit containing means for detecting a speed of the guide head where the rubber profile is applied to the surface, and controlling the drive roller such that the rubber profile is advanced on a basis of a detected speed,
  wherein the drive roller extends between the hollow section and the lower section of the rubber profile such that the lower section extends between the drive roller and the glide plate, and
  the plurality of spikes formed on the profiled circumferential surface of the drive roller at least partially engages the lower section of the rubber profile by sticking into the lower section of the rubber profile.

* * * * *